United States Patent [19]
Locke

[11] Patent Number: 5,073,941
[45] Date of Patent: * Dec. 17, 1991

[54] MULTIFREQUENCY DETECTION

[75] Inventor: Michael E. Locke, Santa Clara, Calif.

[73] Assignee: IBM Corporation, Armonk, N.Y.

[*] Notice: The portion of the term of this patent subsequent to Jan. 17, 2007 has been disclaimed.

[21] Appl. No.: 150,798

[22] Filed: Feb. 1, 1988

[51] Int. Cl.$^5$ .............................................. G10L 5/00
[52] U.S. Cl. ...................................... 381/47; 379/283
[58] Field of Search ........................... 381/47; 379/283

[56] References Cited

PUBLICATIONS

Architectural Overview, "TMS 320C25".

*Primary Examiner*—Emanuel S. Kemeny
*Attorney, Agent, or Firm*—Keith Stephens

[57] ABSTRACT

The detection of DTMF tones is improved in a three-step process: first testing even-numbered samples; then testing odd-numbered samples, and finally testing for tone quality (time interval and frequency stability).

25 Claims, 2 Drawing Sheets

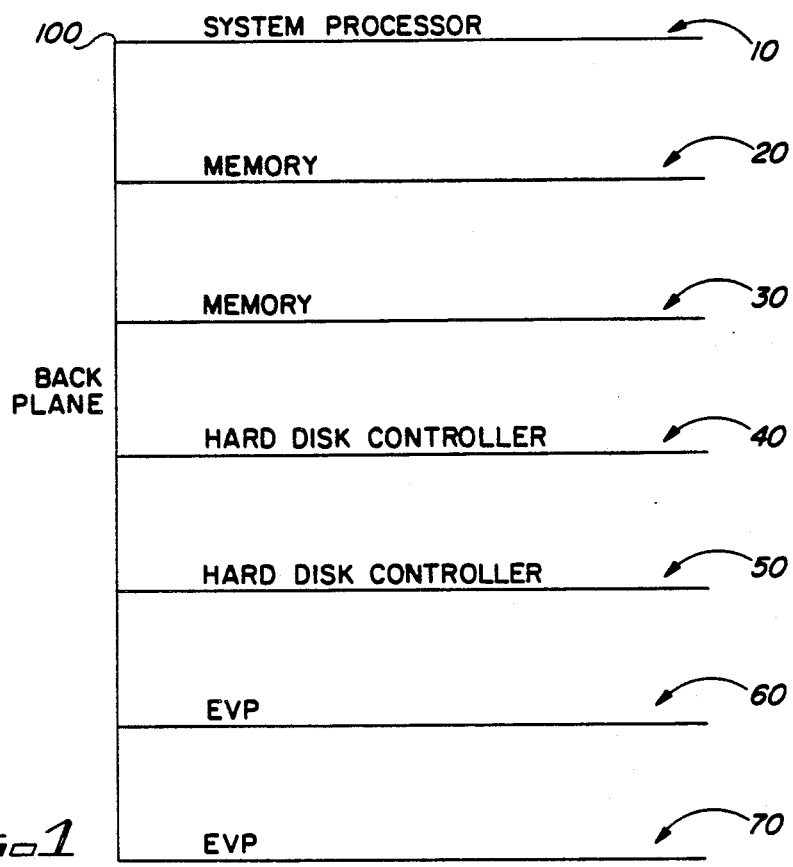
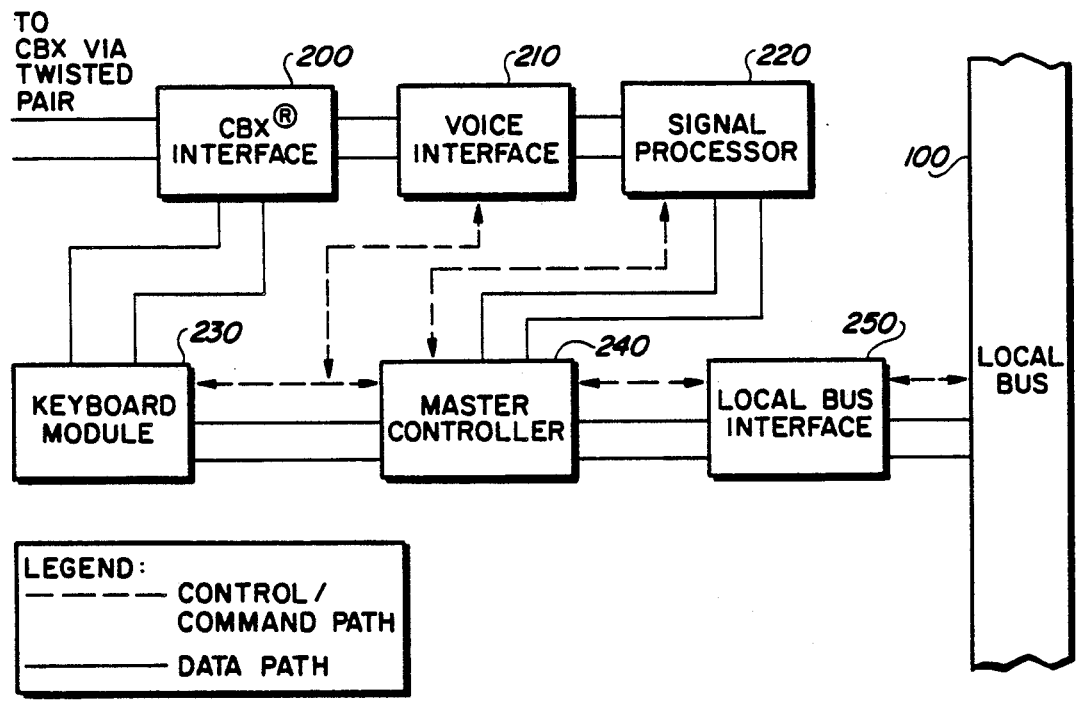

MULTIFREQUENCY DETECTION

BACKGROUND OF THE INVENTION

1. Field of the Invention

This invention generally relates to improvements in the detection and differentiation of multifrequency signal. Specifically, a variety of filters are employed to selectively distinguish tone consisting of single frequency tone pairs. In the preferred embodiment, the filters, are optimized to detect all sixteen of the standard EIA R3464 DTMF tones with high selectivity and speed.

2. Description Of The Prior Art

The past several years have seen the exploitation of digital switch capabilities, particularly the ability to multiplex voice and data through the switch. A natural extension of this capability was the development of a mailbox capability for a user's telephone. This capability allowed much of the written correspondence associated with daily interaction to be replaced with voice communication stored and accessible from a person's phone.

A number of technological hurdles had to be overcome to provide this capability. Many of these dealt with the ability to effectively differentiate analog signals and filter them into their corresponding digital equivalents. This capability is referred to as digital signal processing. A detailed review of some of the modern approaches to digital signal processing is discussed in Stanley et al., "Digital Signal Processing", *Reston Publishing Company, Inc.* 1984. The discussion of non-recursive (FIR) digital filters found in chapter 12 will be helpful in understanding the filtering techniques employed in the subject invention.

An example of an early dial pulse detector is disclosed in International Business Machines Technical Disclosure Bulletin, "Dial Pulse Detector", vol. 18, no. 4, pp. 991-2, Sept. 1975. The disclosed filter attentuates the low-frequency ringing of the dial pulse and improves the signal-to-noise and signal-to-audio ratios from a phone line to detect the dialed number. The processing logic of this system is less selective and much slower then the subject invention.

U.S. Pat. No. 4,369,338, to Souilliard, issued Jan. 18, 1983 discloses a tone detector for the sixteen standard DTMF pairs. The tone detector employs first and second tone detectors designed to provide logic signals in response to detection of predetermined frequencies. Received tones are processed by an active filter consisting of an RC network and amplifier. The filtered inputs are sent to the two tone detectors which are low power, phase-locked loop circuits whose frequency response is controlled by an RC network. The preferred embodiment employs an XR-L567 micropower tone decoder supplied by Exar Integrated Systems, Inc. which includes a quadrature phase detector in combination with the phase-locked loop. The paired filtering, provided to detect DTMF tone pairs, requires additional hardware not present in the subject invention and cannot accommodate the processing requirements for selectivity or speed that are provided by our method.

U.S. Pat. No. 4,620,294, to Cassopolis et al., issued Oct. 28, 1986 discloses a digital signal processor modem. The modem employs an analog-to-digital (A/D) converter to convert a quadrature differential phase keyed signal into a stream of digital pulse-code modulated (PCM) signals. U.S. Pat. No. 4,700,376, to Ohya et al., issued Oct. 13, 1987 discloses an automatic telephone answering apparatus with remote control capability for remote processing. As in the Cassopolis patent, a DTMF receiver is used for processing tone pairs. The two patents have primitive DTMF processors which lack selectivity and the processing speed or our invention.

An additional example of a DTMF receiver is disclosed in International Business Machines Technical Disclosure Bulletin, "Dual-Tone Multi-Frequency Receiver For Compressed Data", vol. 28, no. 9, pp. 4044-5. The article discloses a method which uses a time delay processing to improve selectivity. However, the selectivity and speed are insufficient for the purposes of the subject invention.

SUMMARY OF THE INVENTION

It is therefore an object of this invention to provide highly selective multifrequency detection.

It is a further object of the invention to increase performance of the detection process by selective processing of the signal sample, eliminating redundant calculations and employing limited precision arithmetic processing.

It is another object of the invention to increase the selectivity of the filtering of the signal sample by using a finite impulse response filter.

It is yet another object of the invention to increase the selectivity of the filtering of the signal sample by using a quadrature phase matched filter which is a type of FIR filter.

It is an additional object of the invention to employ signal detection based on minimal power criteria, signal to noise ratio, twist ratio, and long term power stability to increase the selectivity of the tone detection.

According to the invention, these objects are accomplished by processing a stored set of samples to determine if the samples are indicative of a specific DTMF tone. A selective processing of the stored samples is used to make an initial determination of a DTMF tone indication. If a DTMF tone is indicated, then the rest of the signal sample is filtered to selectively verify the indicated DTMF tone. These results are combined with the preliminary results for additional processing to further verify that the DTMF tone has been accurately determined. Techniques such as quadrature phase matched filtering, signal power matching and signal to noise ratio measurement are used to increase the selectivity of the processing.

BRIEF DESCRIPTION OF THE DRAWINGS

The foregoing and other objects, aspects and advantages of the invention will be better understood from the following detailed description of the preferred embodiment of the invention with reference to the accompanying drawings, in which:

FIG. 1 is an illustration of the board layout of the voice processing system in accordance with the present invention; and FIG. 2 is a block diagram of the enhanced voice processor card used to process voice and tones in the present invention;

DESCRIPTION OF THE PREFERRED EMBODIMENT OF THE INVENTION

Figure 3:
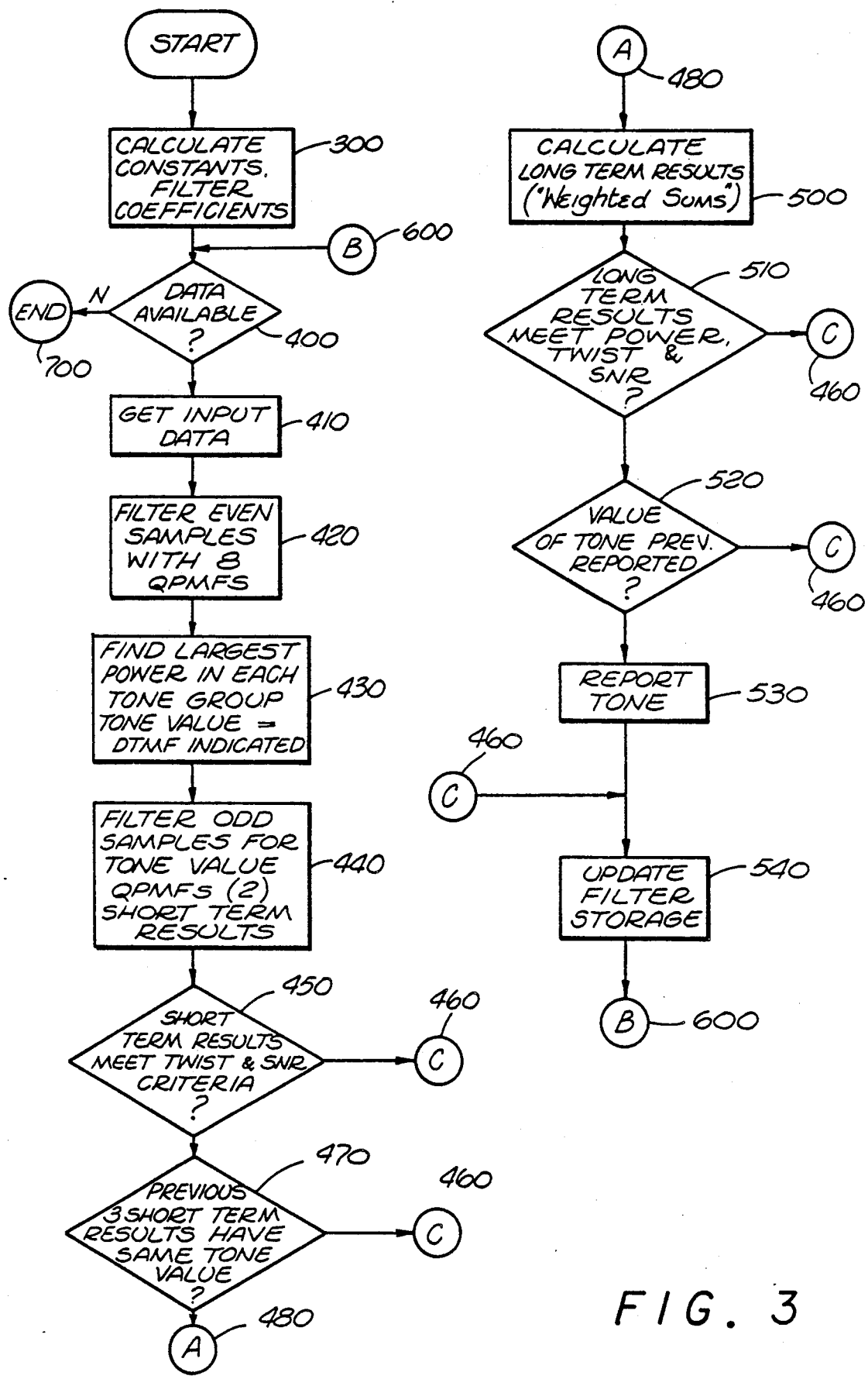
FIG. 3 is an operational flow chart in accordance with the present invention.

The subject invention is disclosed in terms of a preferred embodiment of its use in a voice messaging system marketed by the International Business Machines Corporation. Referring now to the figures, and more particularly to FIG. 1, a slot assignment diagram is provided of the voice messaging system which executes on an 8086 processor. A system processor 10 plugs into the backplane of the system bus 100 to communicate with the other system boards. A pair of memory boards 20 and 30 provide up to four megabytes of system memory. A pair of hard disk controller cards 40 and 50 can control eight disk drives providing up to one-hundred fifty-four megabytes each of secondary storage. A pair of enhanced voice processor cards (EVP) 60 and 70 are also provided. Each of these cards have a programmable digital signal processor which perform various duties including the detection of the DTMF tone pairs.

FIG. 2 provides a block diagram of the EVP. Voice information comes into the card via the computerized branch exchange (CBX) interface 200. The voice interface 210 buffers several samples so that the signal processor can process the samples in a block. The signal processor 220 performs several functions including the DTMF processing. A master controller 240 which consists of an Intel 80186 processor sends the processed data to the local bus after processing commands from the signal processor 220. The keyboard module 230 processes keyboard commands and sends them to the CBX via the CBX interface 200.

The signal processor 220 is a general purpose digital signal processor of the type described in "DSP PRODUCTS DATABOOK", *Analog Devices, Inc.*, 1987 and "TMS320C25 User's Guide", *Texas Instruments, Inc.*, 1986. The discussion in chapter 2 of the TMS320C25 User's Guide will be helpful in understanding the architecture and instruction set of the signal processor.

Digital signal processing of the buffered samples takes place in the signal processor 220. The sampling takes place at the rate of eight thousand samples per second which is higher than the four thousand samples per second necessary to accommodate the highest frequency DTMF component (sixteen hundred thirty-three Hz.). Because of this lesser requirement, only the even numbered samples are processed by the signal processing preselection algorithm. The even samples are input to the quadrature phase matched filter and processed as described below to determine if the signal power falls within the frequency bands allocated for the DTMF tones.

The two specific cases that the signal processing is designed to accommodate are: 1) correctly labeling DTMF tones, and 2) detecting and eliminating noise. To detect and eliminate noise, the odd numbered samples are filtered from the original samples and input to the quadrature phase matched filters at one DTMF high band group frequency and one low band group frequency to detect the DTMF tones. If the filter detects a tone, then it will reinforce the initial finding that a DTMF tone has been received. If the filter does not detect a tone, then this additional processing increases the rejection of noise.

Functional Detection Processing

Step 1: The even samples are initially filtered to make an initial determination of the DTMF tone; i.e. one low group frequency and one high group frequency.

Step 2: The odd samples are filtered and added to the even samples filtered output to make a preliminary verification of the tone/frequency detected in step 1. This test is primarily for rejecting signals with poor signal-to-noise ratios and single tones which can confuse step 3.

Step 3: This step tests to assure that the tone stays consistent for about forty milliseconds and reinforces the minimum tone requirements. The processing rejects the tone if:

(a) the minimum signal power requirement is not met by the filter outputs;
(b) there is a more than $+/-$ 3.5% frequency deviation or if the twist is excessive; or
(c) the signal-to-noise ratio is excessive.

Program Logic

The detailed logic of the invention is presented through the Pascal code used to simulate the preferred embodiment of the invention on an 80286 processor for testing purposes. One of ordinary skill in the art could readily translate the Pascal implementation of the preferred embodiment into a detection system without undue experimentation on either of the aforementioned digital signal processors.

Functional Detection Processing

Step 1: The even samples are initially filtered to make an initial determination of the tone/frequency.

Step 2: The odd samples are as to make a preliminary verification of the tone/frequency detected in step 1. This test is primarily for rejecting signals with poor signal-to-noise ratios and single tones which can confuse step 3.

Step 3: This step tests to assure that the tone stays consistent for about forty milliseconds and reinforces the minimum tone requirements. The processing rejects the tone if:

(a) the minimum signal power requirement is not met by the filter outputs;
(b) there is a more than +/- 3.5% frequency deviation or if the twist is excessive; or
(c) the signal-to-noise ratio is excessive.

Program Logic

The detailed logic of the invention is presented through the Pascal code used to simulate the preferred embodiment of the invention on an 80286 processor for testing purposes. One of ordinary skill in the art could readily translate the Pascal implementation of the preferred embodiment into a detection system without undue experimentation on either of the aforementioned digital signal processors.

```
PROGRAM TWOKEY(INPUT,OUTPUT);
{ (c) Copyright International Business Machines
   Corporation 1987, All Rights Reserved
   This program reads in linear data
   (real format, +/- 1.0 = + 3 dbm) and
   determines if a DTMF tone is present.

-SNR = Signal to Noise Ratio

Quadrature phase matched filters are used to detect
the presence of each of the eight tones that need
to be detected.

The program inputs sample data in 80 sample blocks.

80 samples is required to meet the EIA DTMF spec
(10 mSec).
Each block is examined for the presence of a tone
(i.e. tested for amplitude, SNR, and twist) and
labeled accordingly.

If four blocks in a row all have the same tone
indicated, they are combined with a weighted
average and the longer block is examined for the
presence of a tone.

Subsequently, if a tone is detected, then it is
reported with a high degree of confidence.
Several processing power short cuts are used.

1) For each 80 sample block we will 2:1 decimate
   the input, to initially decide which
   tone/frequency is present based on signal
   power in each band.

2) If a tone/frequency is detected, the skipped
   samples are filtered and added to the
   step 1 results for further tone/frequency
   processing.

3) When adding the (4) 80 sample blocks together
   they must be phase shifted according to:
```

$$80 \text{ sample block} = \sum_{n=0}^{79} x(n)*\exp(twopi*i*f*n/F)$$

The above equation is a mathematical representation of a quadrature phase matched filter.

Desired 320 sample block =

$$\sum_{n=0}^{319} x(n)*\exp(twopi*i*f*n/F)$$

```
i = sqrt(-1)
twopi = 6.28...
f = frequency of interest
F = sampling rate
```

To remove redundant calculations, we process the above 320 sample block as follows:

$$\sum_{n=0}^{79} x(n)*\exp(twopi*i*f*n/F) +$$

$$\sum_{n=80}^{159} x(n)*\exp(twopi*i*f*n/F) +$$

$$\sum_{n=160}^{239} x(n)*\exp(twopi*i*f*n/F) +$$

$$\sum_{n=240}^{319} x(n)*\exp(twopi*i*f*n/F) \text{ ; or}$$

further reduced by:

$$\sum_{n=0}^{79} x(n)*\exp(twopi*i*f*n/F) +$$

$$\sum_{n=0}^{79} x(n+80)*\exp(twopi*i*f*(n+80)/F) +$$

$$\sum_{n=0}^{79} x(n+160)*\exp(twopi*i*f*(n+160)/F) +$$

$$\sum_{n=0}^{79} x(n+240)*\exp(twopi*i*f*(n+240)/F) =$$

$$\sum_{n=0}^{79} x(n)*\exp(twopi*i*f*n/F) +$$

$$\exp(twopi*i*f*80/F)*\sum_{n=0}^{79} x(n+80)*\exp(twopi*i*f*n/F) +$$

$$\exp(twopi*i*f*160/F)*\sum_{n=0}^{79} x(n+160)*\exp(twopi*i*f*n/F)$$

$$+$$

$$\exp(twopi*i*f*240/F)*\sum_{n=0}^{79} x(n+240)*\exp(twopi*i*f*n/F)$$

The bandwidth of the filter can be controlled by multiplying each of the 4 terms in the sum above with weights, similar to using a window with a filter.

```
CONST   FILTERPOINTS = 80;
        SampleRate = 8000.0;
{ FUDGE compensates the SNR calculation for the
following problems:
    (a) each matched filter is not orthogonal to
        the alternate band tone,
    (b) each matched filter is not an integral
        number of cycles of the tone that is being
        recognized,
    (c) a finite SNR must be tolerated.

FUDGE is multiplied by the matched filter
coefficients. }
```

```
            FUDGE = 1.2;
    VAR     FREQ : ARRAY[1..4] OF ARRAY[1..2] OF REAL;
            INBUFF : ARRAY[0..255] OF REAL;
            INBUFFCOUNT : INTEGER;
            FILTERBUFF : ARRAY[0..FILTERPOINTS] OF REAL;
            ToneValue : ARRAY[1..4] OF INTEGER;
            ToneData : ARRAY[1..4] OF ARRAY[1..2] OF
                ARRAY[1..2] OFREAL;
            TEMPToneData : REAL;
            Power : ARRAY[1..4] OF REAL;
            Power1,PowerH : REAL;
            IOBETA : REAL;
            B : ARRAY[1..4] OF ARRAY[1..2] OF REAL;
            MatchedFilter : ARRAY[1..4] OF ARRAY[1..2]
                OFARRAY[0..FILTERPOINTS] OF ARRAY[1..2]
                OF REAL;
            MFOut :ARRAY[1..4] OF ARRAY[1..2]
                OF ARRAY[1..2] OF REAL;
            PhaseShift : ARRAY[1..4] OF ARRAY[1..2]
                OF ARRAY[1..4] OFARRAY[1..2] OF REAL;
            InChar : Char;
            InputFile,OutputFile : Text;
            Console : Text;
            FileName : String[32];
            I,J,K,L : INTEGER;
            TWOPI : REAL;
            MinPower,HighTwist,LowTwist : REAL;
            HighTwistLong,LowTwistLong : REAL;
            LastReport : BOOLEAN;
            temp : real;
(
These routines are used to generate a Kaiser window.
A four point Kaiser window is used for the weights
in the long term filter calculations.
)
FUNCTION FLOAT(I : INTEGER):REAL;
BEGIN
    FLOAT := I;
END;
FUNCTION IO(X:REAL):REAL;
VAR     Y,T,E,DE,SDE : REAL;
        II : INTEGER;
BEGIN
    Y := X/2.0;T := 1.0E-8;E:= 1.0;DE := 1.0;
    FOR II := 1 TO 25 DO
    BEGIN
        DE := DE*Y/FLOAT(II);
        SDE := DE*DE;
        E := E + SDE;
        IO := E;
        IF E*T SDE > 0 THEN EXIT;
    END;
END;

FUNCTION KAISER(BETA,N,CYCLELENGTH:REAL):REAL;
VAR     TEMP : REAL;
BEGIN
    TEMP:=1.0-4.0*(N*N)/
        ((CYCLELENGTH-1)*(CYCLELENGTH-1));
IF TEMP > 0
THEN
    KAISER := IO(BETA*SQRT(TEMP))/IOBETA
ELSE
    IF TEMP >-1E-8
    THEN
        KAISER := 1.0/IOBETA
    ELSE
        KAISER := 0.0;
END;
PROCEDURE Window;
VAR     Correction : real;
        TempKaiser : REAL;
BEGIN
    FOR I := 1 TO 4 DO FOR J := 1 TO 2 DO
    BEGIN
{ Correction ensures that all of the long term
filters have the same maximum response, regardless
of beta }
        Correction := 0.0;
        FOR K := 1 TO 4 DO
        BEGIN
            IOBETA := IO(B[I,J]);
            TempKaiser := KAISER(B[I,J],FLOAT(K-1)-1.5,4);
            PhaseShift(I,J,K,1] := TempKaiser *
                                    COS(TWOPI *
                                    Freq[I,J] *
                    FLOAT(FilterPoints*(K-1))/SampleRate);
            PhaseShift(I,J,K,2] := TempKaiser *
                                    SIN(TWOPI *
    Freq[I,J] *
    FLOAT(FilterPoints*(K-1))/SampleRate);
    Correction := TempKaiser + Correction;
        END;
        FOR K := 1 TO 4 DO
        BEGIN
            PhaseShift[I,J,K,1] :=
                PhaseShift[I,J,K,1]/(Correction);
            PhaseShift[I,J,K,2] :=
                PhaseShift[I,J,K,2]/(Correction);
        END;
    END;
END;
(
This procedure fills the filter storage from the
input sample file.)
FUNCTION GetInputData:BOOLEAN;
BEGIN
    GetInputData := TRUE;
    FOR I := 0 TO FILTERPOINTS-1 DO
    BEGIN
        IF INBUFFCOUNT = 0 THEN
        BEGIN
            IF EOF(InputFile) AND (I=0)
            THEN
            BEGIN
                GetInputData := FALSE
            END
            ELSE
                FOR J := 0 TO 255 DO
                    IF NOT(EOF(InputFile))
                    THEN
                        READLN(InputFile,INBUFF[J])
                    ELSE
                        INBUFF[J] := 0.0;
            INBUFFCOUNT := 256;
        END;
        FilterBuff[I] := INBUFF[256-INBUFFCOUNT];
        INBUFFCOUNT := INBUFFCOUNT-1;
    END;
END;
```

```
{ ****************************************************
 *       main routine
 **************************************************** }
BEGIN
  LastReport := FALSE;
  ASSIGN(Console,'con');RESET(Console);
  TWOPI := 8.0*ARCTAN(1.0);
{ These are the standard DTMF frequencies }
  Freq[1,1] := 697.0;Freq[2,1] := 770.0;
  Freq[3,1] :=852.0;Freq[4,1] := 941.0;
  Freq[1,2] := 1209.0;Freq[2,2] :=1336.0;
  Freq[3,2] := 1477.0;Freq[4,2] := 1633.0;

{ These are the default Beta values. They are used
to generate weights for the phase shifts for the
long term filter calculations in order to control
the bandwidth of the long term filters }

B[1,1] := 0.4; B[2,1] := 1.2; B[3,1] := 2.0;
  B[4,1] := 3.0; B[1,2] := 5.1; B[2,2] := 6.2;
  B[3,2] := 8.0; B[4,2] := 11.6;
  Window;
{ These are the empirically determined values for
twist etc }

(HighTwist means that the high tone can be no more
than 8 DBgreater than the low tone )

{ LowTwist means that the low tonecan be no more
than 4 db lower than the high tone}

{ A fudgefactor is added in to compensate for the
imperfect filters }

HighTwist := exp(ln(10.0)*(-8-3.5)/10.0);
LowTwist :=exp(ln(10.0)*(-4-3.5)/10.0);

{ These should correspond to -30 dbm
   (3 db for mulaw peak, 3 db for sine duty cycle) }

MinPower := float(FilterPoints * FilterPoints) *
             exp(ln(10.0)*(-36.0)/10.0);
  HighTwistLong := HighTwist;
  LowTwistLong := LowTwist;
FOR I := 1 TO 4 DO FOR J := 1 TO 2 DO
FOR K := 0 TOFilterPoints-1 DO
BEGIN
  MatchedFilter[I,J,K,1] := Fudge *
  COS(TWOPI*Freq[I,J]*FLOAT(K)/SampleRate) *
  sqrt(2.0/float(FiUlterPoints));
  MatchedFilter[I,J,K,2] := Fudge *
  SIN(TWOPI*Freq[I,J]*FLOAT(K)/SampleRate) *
  sqrt(2.0/float(FiUlterPoints));
END;
FOR I := 1 TO 4 DO
BEGIN
  ToneValue[I] := 0;
  Power[I] := 0.0;
END;

FOR I := 1 TO 4 DO FOR J := 1 TO 2 DO
FOR K := 1 TO 2 DO
BEGIN
  ToneData[I,J,K] := 0.0;
END;

INBUFFCOUNT := 0;

While GetInputData DO
BEGIN
{
This is the decimated filter for initial selection
}
    FOR J := 1 TO 4 DO
    FOR L := 1 TO 2 DO
    FOR K := 1 TO 2 DO
    BEGIN
      MFOut[J,L,K] := 0.0;
      FOR I := 0 TO (FilterPoints DIV 2) - 1 DO
      BEGIN
        MFOut[J,L,K] :=
        MFOut[J,L,K] + FilterBuff[I*2] *
        MatchedFilter[J,L,I*2,K];
      END;
    END;

{ Now we must decide which DTMF is most likely }
    J := 1;
    L := 1;
    FOR I := 1 TO 2 DO
    BEGIN
      TEMP := 0.0;
      FOR K := 1 TO 4 DO
      BEGIN
        IF MFOut[K,I,1] * MFOut[K,I,1] +
           MFOut[K,I,2] * MFOut[K,I,2] > TEMP
        THEN
          BEGIN
            TEMP := MFOut[K,I,1] * MFOut[K,I,1] +
                    MFOut[K,I,2] * MFOut[K,I,2];
            IF I = 1
            THEN
              L := K
            ELSE
              J := K;
          END;
      END;
    END;

ToneValue[4] := (L-1)*4 + J-1;

{ Now that the DTMF value is decided, we can fill in
the skipped samples }
{ Here we do the low frequencies }
    FOR I := 0 TO (FilterPoints DIV 2) - 1 DO
    FOR K := 1 TO 2 DO
    BEGIN
      MFOut[J,2,K] := MFOut[J,2,K] +
    FilterBuff[I*2+1] * MatchedFilter[J,2,I *
    2+1,K];
    END;

{ Here we do the high frequencies }

FOR I := 0 TO (FilterPoints DIV 2) - 1 DO
    FOR K := 1 TO 2 DO
    BEGIN
      MFOut[L,1,K] := MFOut[L,1,K] +
      FilterBuff[I*2+1] *
      MatchedFilter[L,1,I*2+1,K];
    END;
```

```
{
Now we are ready to copy the tone to the FilterBuff
data area and then test the data to see if it meets
the requirements for SNR, amplitude and twist.
}
    FOR K := 1 TO 2 DO
    BEGIN
       ToneData[4,1,K] := MFOut[L,1,K];
       ToneData[4,2,K] := MFOut[J,2,K];
    END;
    Powerl := ToneData[4,1,1] * ToneData[4,1,1] +
              ToneData[4,1,2] * ToneData[4,1,2];
    Powerh := oneData[4,2,1] * ToneData[4,2,1] +
             ToneData[4,2,2] * ToneData[4,2,2];
    Power[4] := 0.0;
    FOR I := 0 TO FilterPoints - 1 DO
       Power[4] := Power[4] + FilterBuff[I] *
FilterBuff[I];
       BEGIN
       IF Power[4] > (Powerl + Powerh)
       THEN
          ToneValue[4] := -1
       ELSE
       BEGIN
          IF (LowTwist * Powerl) > Powerh
          THEN ToneValue[4] := -2
          ELSE
          BEGIN
             IF Powerl < Powerh*HighTwist
             THEN ToneValue[4] := -3;
          END;
       END;
    END;

{ Now we have completed the testing of the short
term DTMF, we need to generate and test the long
term DTMF. We simply require the DTMF to be present
to 40 milliseconds. If each of the 4 short term
filter outputs indicate the same tone present, then
we can calculate the long term filter output and
repeat all of the above tests on the long term
filter output with slightly different fudge factors.
}

K := (ToneValue[1] AND 3) + 1;
    L := ((ToneValue[1] AND $0C) DIV 4) + 1;

{
Add up the long term signal power for the input. If
every signalmatches, then all is OK, if any signal
does not match, then the entire filter output is
labeled invalid (tone value is set equal to -5)
}
    IF ToneValue[1] >= 0
    THEN
    BEGIN
       TEMPToneData := ToneData[1,1,1] *
         PhaseShift[L,1,1,1] - ToneData[1,1,2] *
         PhaseShift[L,1,1,2];
       ToneData[1,1,2] := ToneData[1,1,1] *
         PhaseShift[L,1,1,2] + ToneData[1,1,2] *
         PhaseShift[L,1,1,1];
       ToneData[1,1,1] := TEMPToneData;
       TEMPToneData := ToneData[1,2,1] *
         PhaseShift[K,2,1,1] - ToneData[1,2,2] *
         PhaseShift[K,2,1,2];
       ToneData[1,2,2] := ToneData[1,2,1] *
         PhaseShift[K,2,1,2] + ToneData[1,2,2] *
         PhaseShift[K,2,1,1];
       ToneData[1,2,1] := TEMPToneData;
       FOR I := 2 TO 4 DO
       BEGIN
          IF ToneValue[1] = ToneValue[I]
          THEN
          BEGIN
             ToneData[1,1,1] := ToneData[1,1,1] +
                ToneData[I,1,1] * Phaseshift[L,1,I,1] -
                ToneData[I,1,2] * PhaseShift[L,1,I,2];
             ToneData[1,1,2] := ToneData[1,1,2] +
                ToneData[I,1,1] * PhaseShift[L,1,I,2] +
                ToneData[I,1,2] * PhaseShift[L,1,I,1];
             ToneData[1,2,1] := ToneData[1,2,1] -
                ToneData[I,2,1] * PhaseShift[K,2,I,1] -
                ToneData[I,2,2] * PhaseShift[K,2,I,2];
             ToneData[1,2,2] := ToneData[1,2,2] +
                ToneData[I,2,1] * PhaseShift[K,2,I,2] +
                ToneData[I,2,2] * PhaseShift[K,2,I,1];
          END
          ELSE
          BEGIN
             IF ToneValue[1] >= 0
             THEN
             BEGIN
                If ToneValue[I] >= 0
                THEN
                   ToneValue[1] := -5
                ELSE
                   ToneValue[1] := ToneValue[I];
             END;
          END;
       END;
    END;

{ Now we have the long term filter results and need
to test SNR and twist }

Powerl := ToneData[1,1,1] * oneData[1,1,1] +
              ToneData[1,1,2] * ToneData[1,1,2];
    Powerh := ToneData[1,2,1] * ToneData[1,2,1] +
              ToneData[1,2,2] * ToneData[1,2,2];
    IF ToneValue[1] >= 0
    THEN
    BEGIN { We must doctor the signal power to account for
pass band ripple in the +/- 1.5% tolerance and the
accumulation over 4 cycles }
       If Powerl + Powerh < MinPower
       THEN
          ToneValue[1] := -4
       ELSE
       BEGIN
          IF (Power[4]*EXP(LN(10.0)*(0.0-0.15))) >
          (Powerl+Powern)
          THEN
             ToneValue[1] := -6
          ELSE
          BEGIN
             IF (LowTwistLong * Powerl) > Powerh
             THEN
                ToneValue[1] := -7
             ELSE
```

```
    BEGIN
        IF Powerl < (Powerh * HighTwistLong)
        THEN
            ToneValue[1] := -8;
        END;
    END;
  END;
END;

( More sophisticated tests can be performed, but the
above minimal tests are sufficient for most needs )

IF NOT(LastReport)
THEN
BEGIN
    IF ToneValue[1] >= 0
    THEN
    BEGIN
        WRITELN(OutputFile,ToneValue[1]);
        LastReport := TRUE;
    END;
END
ELSE
    IF ToneValue[1] < 0
    THEN
        LastReport := FALSE;

( What we need to print out here is the short and
long term filter outputs, the signal power output,
and the short and long term tone decisions
WRITELN(OutputFile,ToneValue[4]:1,Power[4]:10);
WRITELN(OutputFile,ToneValue[1]:1);
WRITELN(OutputFile,
        ToneData[4,1,1]:12,ToneData[4,1,2]:12,
        ToneData[4,2,1]:12,ToneData[4,2,2]:12);
        WRITELN(OutputFile,
        ToneData[1,1,1]:12,ToneData[1,1,2]:12,
        ToneData[1,2,1]:12,ToneData[1,2,2]:12);
)
( Update the long term filter storage )
    FOR I := 1 TO 3 DO
    BEGIN
        ToneData[I,1,1] := ToneData[I+1,1,1];
        ToneData[I,2,1] := ToneData[I+1,2,1];
        ToneData[I,1,2] := ToneData[I+1,1,2];
        ToneData[I,2,2] := ToneData[I+1,2,2];
        ToneValue[I] := ToneValue[I+1];
        Power[I] := Power[I+1];
    END;
END; ( while getinput data do )
CLOSE(InputFile);CLOSE(OutputFile);
END.
```

While the invention has been described in terms of a preferred embodiment in a specific operating system environment, those skilled in the art will recognize that the invention can be practiced, with modification, in other and different environments within the spirit and scope of the appended claims.

What is claimed:

1. A method of detecting frequencies in a plurality of stored samples in a memory, comprising:
   (a) selectively processing a first subset of said plurality of stored samples to detect a signal of a particular frequency;
   (b) selectively filtering a second subset of said plurality of stored samples;
   (c) adding said first subset of said plurality of stored samples to said second subset of said plurality of stored samples and storing a plurality of resultant samples in said memory; and
   (d) processing said plurality of resultant samples to verify said signal of a particular frequency.

2. A method for detecting frequencies as recited in claim 1, wherein said first subset of said plurality of stored samples consists of all even numbered samples form said plurality of stored samples.

3. A method for detecting frequencies as recited in claim 1, wherein said first subset of said plurality of stored samples consists of all odd numbered samples from said plurality of stored samples.

4. A method for detecting frequencies as recited in claim 1, wherein said step of selectively filtering a second subset of said plurality of stored samples to verify said possible frequency includes the use of a finite impulse response filter.

5. A method for detecting frequencies as recited in claim 1, wherein said step of selectively filtering a second subset of said plurality of stored samples to verify said possible frequency includes the use of a quadrature phase matched filter.

6. A method for detecting frequencies as recited in claim 1, wherein said step of selectively filtering a second subset of said plurality of stored samples to verify said possible frequency includes a reduction of processing through an elimination of redundant calculations.

7. A method for detecting frequencies as recited in claim 1, wherein said step of processing said plurality of resultant samples to verify said possible frequency is based on a minimal power criteria of said plurality of stored samples.

8. A method for detecting frequencies as recited in claim 1, wherein said step of processing said plurality of resultant samples to verify said possible frequency is based on a signal to noise ratio of said plurality of stored samples.

9. A method for detecting frequencies as recited in claim 1, wherein said step of processing said plurality of resultant samples to verify said possible frequency is based on a twist ratio of said plurality of stored samples.

10. A method for detecting frequencies as recited in claim 1, wherein said step of processing said plurality of resultant samples to verify said possible frequency is based on a long term power stability of said plurality of stored samples.

11. A method for detecting frequencies as recited in claim 1, wherein said processing is designed to execute on a limited precision arithmetic signal processor.

12. A method for detecting frequencies as recited in claim 1, wherein no further processing transpires when said possible frequency is not detected.

13. Apparatus for detecting frequencies in a plurality of stored samples in a memory, comprising:
   (a) means for selectively processing a first subset of said plurality of stored samples to detect a signal of a particular frequency;
   (b) means for selectively filtering a second subset of said plurality of stored samples;
   (c) means for adding said first subset of said plurality of stored samples to said second subset of said plurality of stored samples and storing a plurality of resultant samples in said memory; and
   (d) means for processing said plurality of resultant samples to verify said signal of a particular frequency.

14. The apparatus for detecting frequencies as recited in claim 13, wherein said means for selectively processing a first subset of said plurality of stored samples to detect a possible frequency includes means for selecting all even numbered samples from said plurality of stored samples.

15. The apparatus for detecting frequencies as recited in claim 13, including means for filtering said plurality of stored samples with a finite impulse response filter.

16. The apparatus for detecting frequencies as recited in claim 13, including means for filtering said stored samples with a quadrature phase matched filter.

17. The apparatus for detecting frequencies as recited in claim 13, including means for filtering said stored samples if a possible frequency is detected with means for reducing processing through an elimination of redundant calculations.

18. The apparatus for detecting frequencies as recited in claim 13, including means for processing based on a weighted summing of said plurality of stored samples.

19. The apparatus for detecting frequencies as recited in claim 13, including means for filtering based on a minimal power criteria of said plurality of stored samples.

20. The apparatus for detecting frequencies as recited in claim 13, including means for filtering based on a signal to noise ratio of said plurality of stored samples.

21. The apparatus for detecting frequencies as recited in claim 13, including means for filtering based on a twist ratio of said plurality of stored samples.

22. The apparatus for detecting frequencies as recited in claim 13, including means for filtering based on a long term power stability of said plurality of stored samples.

23. The apparatus for detecting frequencies as recited in claim 13,, wherein said apparatus is a limited precision arithmetic signal processor.

24. The apparatus for detecting frequencies as recited in claim 13, wherein said means for selectively processing a first subset of said plurality of stored samples to detect a possible frequency includes means for selecting all even numbered samples from said plurality of stored samples.

25. A method for detecting frequencies as recited in claim 13, wherein no further processing transpires when said possible frequency is not detected.

* * * * *

UNITED STATES PATENT AND TRADEMARK OFFICE
CERTIFICATE OF CORRECTION

PATENT NO. : 5,073,941
DATED : December 17, 1991
INVENTOR(S) : Locke

It is certified that error appears in the above-identified patent and that said Letters Patent is hereby corrected as shown below:

In column 4, delete lines 31 through 68 as they are a redundant, uncorrected version of the text in line 1 through 30.

In column 16 in claim 21 at line 7 change "oh" to --on--.

In column 16 in claim 23 at line 13 change "13,," to --13,--.

Signed and Sealed this

Twenty-third Day of May, 1995

Attest:

BRUCE LEHMAN

*Attesting Officer*  *Commissioner of Patents and Trademarks*